United States Patent [19]

Ikeura

[11] Patent Number: 5,377,110
[45] Date of Patent: Dec. 27, 1994

[54] CONTROL SYSTEM FOR CONTROLLING THE OUTPUT POWER OF A POWER TRAIN

[75] Inventor: Kenji Ikeura, Zushi, Japan
[73] Assignee: Nissan Motor Co., Ltd., Yokohama, Japan
[21] Appl. No.: 953,003
[22] Filed: Sep. 29, 1992
[30] Foreign Application Priority Data Sep. 30, 1991 [JP] Japan .................. 3-251664

[51] Int. Cl.⁵ .............................................. B60K 41/18
[52] U.S. Cl. ........................ 364/424.1; 364/426.02; 364/424.03; 180/197
[58] Field of Search ............. 364/431.03, 431.01, 364/431.06, 424.1, 426.01, 426.02, 426.03, 426.04, 442; 74/866, 867, 857; 180/197, 170; 340/825.31, 325.34; 123/480, 350

[56] References Cited

U.S. PATENT DOCUMENTS

| | | | |
|---|---|---|---|
| 4,559,599 | 12/1985 | Habu et al. | 364/424.1 |
| 4,589,302 | 5/1986 | Oda et al. | 74/866 |
| 4,682,667 | 7/1987 | Hosaka | 364/426 |
| 4,964,051 | 10/1990 | Sekozawa et al. | 364/431.03 |
| 5,033,328 | 7/1991 | Shimanaka | 364/424.1 |
| 5,042,324 | 8/1991 | Suzuki | 74/857 |
| 5,197,008 | 3/1993 | Itoh et al. | 364/426.01 |

FOREIGN PATENT DOCUMENTS 3-111610  5/1991  Japan .

Primary Examiner—Thomas G. Black
Assistant Examiner—Jacques H. Louis-Jacques
Attorney, Agent, or Firm—Foley & Lardner

[57] ABSTRACT

In a system for controlling the output power of a power train an overall control is carried out so that a mismatch is not caused between the output characteristic changeover control of a variable output characteristic engine and the speed change control of an automatic transmission. From the requested driving force and the revolution speed that are respectively found by the requested driving force detection device and the speed detection device the control output determination device finds a combination of at least two of the engine output characteristic, the speed change stage and the engine throttle opening according to the two dimensional map of the requested driving force and the revolution speed, and the changeover executing device conducts total control on the power train so that the combination can be attained. When the power train is controlled totally as the combination, a mismatch between the changeover control of engine output characteristics and the speed change control can be avoided.

4 Claims, 9 Drawing Sheets

FIG_2

FIG_4

FIG_5

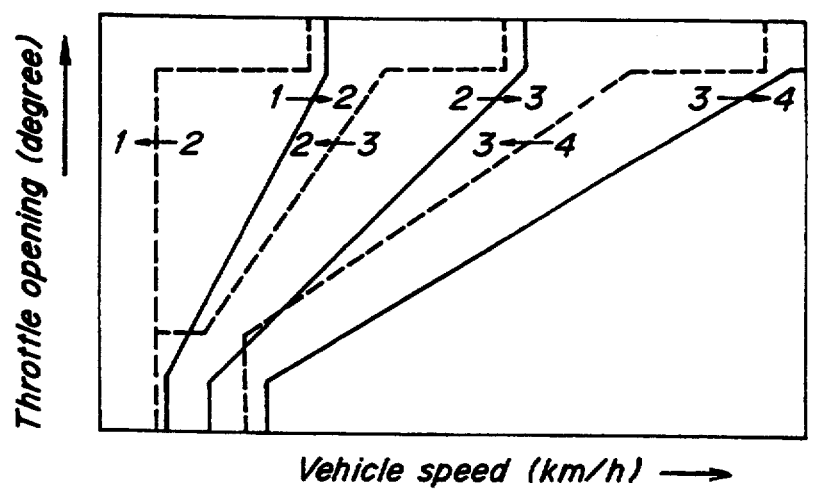
FIG_11

CONTROL SYSTEM FOR CONTROLLING THE OUTPUT POWER OF A POWER TRAIN

BACKGROUND OF THE INVENTION

The present invention relates to a total control system of power trains in which an engine having a plurality of output characteristics with respect to a throttle opening is combined in tandem with an automatic transmission having a plurality of transmission gear ratios.

The aforementioned power train is applied, for example, to a power unit of a vehicle. As an engine which can be applied to the power unit, Japanese Patent Application Laid Open No. 3-111610 discloses a so-called variable valve type engine which includes a plurality of cams for operating suction and exhaust valves so that the output characteristics can be changed over with respect to the throttle opening.

This engine is provided with 3 kinds of cams for suction and exhaust valves. As shown in the valve lift characteristic diagram of FIG. 9, these cams include a fuel consumption cam (referred to as "P cam", hereinafter) in which importance is attached to fuel consumption in the case of a partial-load operation, a low speed cam (referred to as "L cam", hereinafter) that is useful in the case of low speed operation, and a high speed cam (referred to as "H cam", hereinafter) that useful in the case of high speed operation. These cams are selectively used in accordance with the present operating condition of load and speed of the engine. As illustrated in FIG. 10 in which output torque characteristics in the case of full throttle are shown, the output characteristics of the engine can be changed over according to the cam to be used, which is selected from P, L and H cams.

On the other hand, the automatic transmission is usually structured as in RE4F02A type automatic transaxle developed and utilized by the assignee of this application. For example, as shown in FIG. 11, according to the speed change pattern that has been previously determined in the form of a two dimensional map of vehicle speed and throttle opening, an appropriate speed change ratio (the first to fourth speed change ratio) is determined from the vehicle speed and throttle opening, when the determined speed change ratio is different from the present one, the transmission gear is changed.

However, when the engine output characteristics changeover control and the speed change gear changeover control are individually conducted in the power train in which the engine and automatic transmission are connected in tandem in the manner of the aforementioned conventional example, it is the same as a case in which 3 kinds of engines having-different output characteristics are combined with the same automatic transmission. Therefore, a predetermined performance can be obtained only at a specific output characteristics, and further the speed is changed when the output characteristic is changed over. Due to the aforementioned speed change, the output characteristics is changed over, so that both control operations affect each other, and a stable operating condition cannot be provided. Therefore, what is called "cam hunting" and "shift hunting" are caused. Accordingly, the driving property deteriorates, and further it is disadvantageous from the viewpoint of improving fuel consumption and exhaust gas emission characteristics.

SUMMARY OF THE INVENTION

It is a primary object of the present invention to conduct total control on a power train under the condition that at least two of the cams be used, a spewed change stage and an engine throttle opening are combined, so that the aforementioned hunting problems can be solved.

In order to accomplish the aforementioned object as the concept is shown in FIG. 1, the present invention provides a total control system for a power train in which an engine having a plurality of output characteristics to be changed over with respect to a throttle opening, is combined in tandem with an automatic transmission having a plurality of transmission gear ratios to be changed over, said total control system comprising: a requested driving force detection means to detect a driving force that is requested by a driver; a speed detection means to detect the revolution speed of an arbitrary rotational portion of said power train; a control output determination means that finds a combination of at least two of the output characteristics previously determined in the form of a two dimensional map of the requested driving force and revolution speed, the speed change stage, and the engine throttle opening, from the requested driving force and revolution speed detected by these means; and a changeover execution means to accomplish the control output that has been determined as a result of the aforementioned combination.

The device of the present invention is structured such that the power train can be controlled totally in the following manner: a combination (a combination of the cam and speed change stage in the example shown in the drawings) of at least two of the preferable engine outputs (the cam in the example shown in the drawings), the speed change stage and the throttle opening, is found from the requested driving force (accelerator pedal stroke AST in the example shown in the drawings) and the speed (the revolution speed of transmission output representing vehicle speed V in the example shown in the drawings) of an arbitrary rotational portion of the power train; and the power train is controlled totally so that the combination can be attained. At least, with regard to this combination, related control can be carried out so that a mismatch can be avoided. Accordingly, a predetermined power train performance can be provided, and the occurrence of "hunting" can be prevented in the control of the engine and transmission. Therefore, the control system of the present invention is greatly advantageous to improve the driving property, fuel consumption and exhaust emission.

In the present invention, it is advantageous to use an engine in which the output characteristics are changed over by properly using cams for operating suction and exhaust valves.

The driving force requested by a driver can be obtained from the accelerator pedal stroke, the intake amount of the engine, and the fuel injection amount, and the requested driving force detection means preferably detects at least one of them.

The control output determination means preferably determines the combination of the engine output characteristics, the speed change stage from the requested driving force, the transmission output revolution speed or the engine speed. In this case, the control output determination means preferably determines the engine throttle opening in accordance with the requested driving force, engine speed, output characteristics, and speed change stage. It is practical to set a hysteresis in the control output determination means so as to change over the combination of the output characteristics and speed change stage.

From the requested driving force detection by the requested driving force detection means, and the revolution speed detected by the speed detection means, on the basis of the two dimensional map of the requested driving force and the revolution speed, the control output determination means finds a combination of at least two of the engine output characteristics, speed change stage and engine throttle opening, and the changeover execution means conducts an total control operation on the power train so that the aforementioned combination can be attained.

Since the power train is controlled overall as a result of the combination, a mismatch can be avoided with regard to this combination, and a predetermined power train performance can be provided, at the same time, the occurrence of "hunting" can be prevented when the engine and transmission are controlled.

In the case of an engine in which the output characteristics are changed over by properly using the cams for suction and exhaust valves, the changeover may be carried out stepwise, so that the aforementioned effects are remarkable.

It is practical to detect the requested driving force from at least one of the accelerator pedal stroke, engine intake amount, and fuel injection amount, and in this case the accuracy can be improved.

When the engine output characteristics and the speed change stage are combined and the combination is determined from the requested driving force and the transmission output revolution speed or engine speed, the problems of "cam hunting" and "shift hunting" can be positively solved. That is, when two of the three variables are specified, the output does not become 2 values but becomes 1 value.

When the engine throttle opening corresponding to the combination of the engine output characteristics and speed change stage, is found as a parameter of the requested driving force and engine speed, it becomes more practical and accurate, and the characteristics can be made smooth in such a manner that the driving force is not changed sharply when the accelerator pedal is stepped on, so that the driving property can be improved.

In order to ensure the stability of engine control, it is preferable to set a hysteresis in the changeover of the output characteristics and speed change stage.

BRIEF DESCRIPTION OF THE DRAWINGS

FIG. 11 is a general speed change pattern of an automatic transmission.

DETAILED DESCRIPTION OF THE PREFERRED EMBODIMENTS

With reference to the attached drawings, an example of the present invention will be explained in detail as follows.

Figure 1:
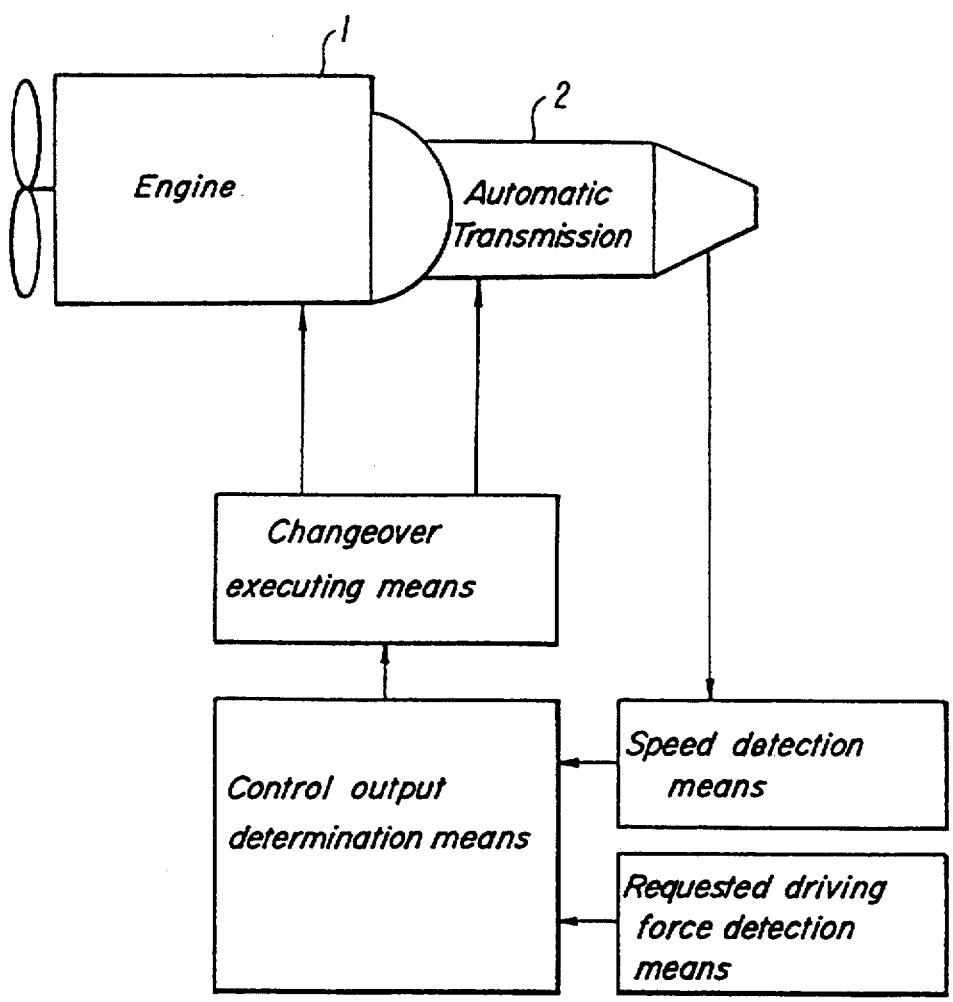
FIG. 1 is a schematic illustration showing the general concept of the total control system of a power train of the present invention as discussed above.
Figure 2:
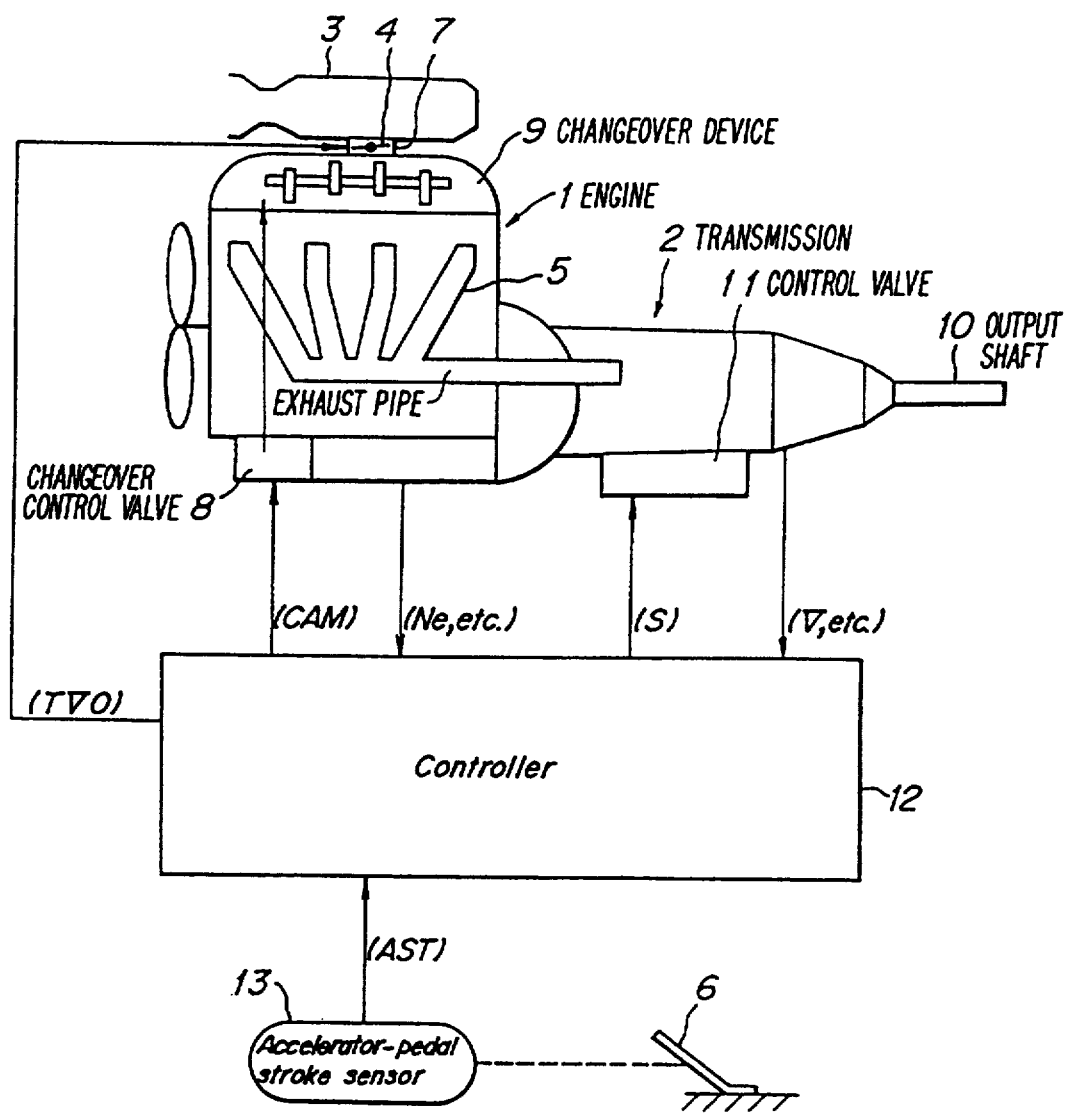
FIG. 2 is a block diagram of hardware showing an example of the device of the present invention.

FIG. 2 shows an example of the total control system of the present invention. In the drawing, numeral 1 is an engine, and numeral 2 is an automatic transmission. The device of the invention controls the power train totally in which the engine 1 and the automatic transmission 2 are combined in tandem.

In the engine 1, injected fuel is burnt by air that is sucked into the engine from an air cleaner 3 through a throttle valve 4, and the obtained output is inputted into the automatic transmission 2, and exhaust gas is discharged from an exhaust pipe 5. In the engine 1, the throttle valve 4 is not mechanically connected with an accelerator 6 that is operated by a driver, but the throttle valve 4 is electronically controlled through a throttle actuator 7. In this engine, a variable valve explained in FIGS. 7 and 8 disclosed in the aforementioned Japanese Patent Application Laid Open No. 3-111610 is adopted for the suction and exhaust valves so that the aforementioned suction ant exhaust can be carried out synchronously with the engine revolution. The three kinds of cams are changed over by a cam changeover mechanism 9 operated in accordance with a cam changeover control valve 8.

The automatic transmission 2 changes the revolution speed of the engine 1 by a gear ratio corresponding to the selected speed change stage, and the driving force is transmitted to an output shaft 10 and supplied to the wheels of a vehicle. The automatic transmission 2 is electronically controlled through a control valve 11, and is described in "Service Manual for RE4R01A-type Automatic Transmission" published by Nissan Motor Co., Ltd, which is herein incorporated by reference.

In this example, a controller 12 carries out TVO control (throttle valve opening control) of the opening of the throttle valve 4 through the throttle actuator 7, cam changeover control (control command CAM) through the cam changeover valve 8, and speed change control (control command S) through the control valve 11. In order to carry out the aforementioned control and other power train control, the controller 12 is supplied with an engine condition signal such as engine speed Ne, a transmission condition signal such as transmission output revolution (vehicle speed) V, and a signal sent from an accelerator pedal stroke sensor 13 that detects stroke AST (driving force requested by a driver) of the accelerator 6.

Figure 3:
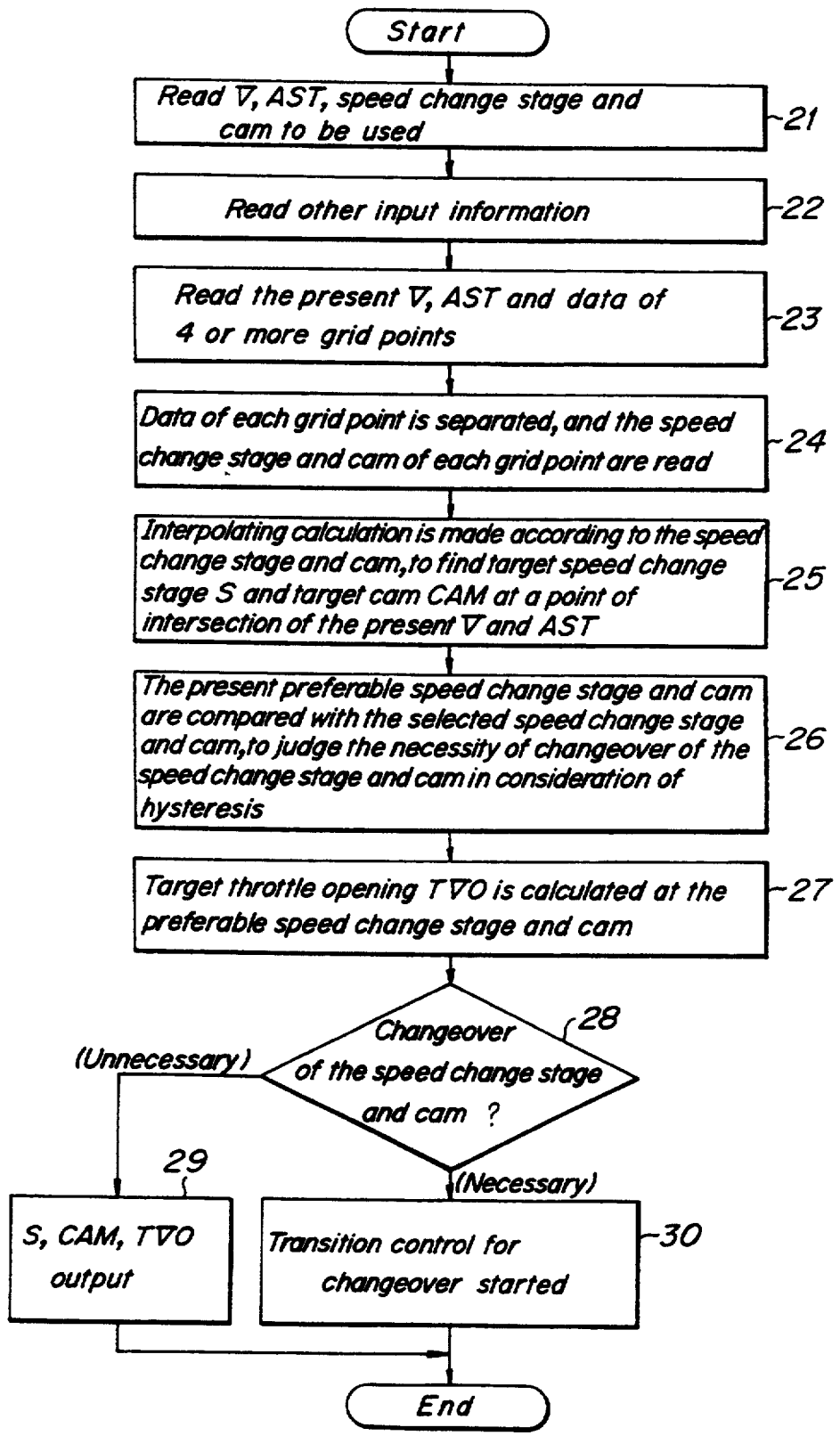
FIG. 3 is a flow chart of a control program that is carried out by a controller of this example.

According to the aforementioned inputted information, the controller 12 carries out the control program shown in FIG. 3 so that the total control of a power train, which is the target of the present invention, can be realized. This program is repeatedly conducted by a periodic interruption. First, the command speed change stage (represented by character S, hereinafter) that is determined by vehicle speed V, accelerator pedal stroke AST and speed change command S, and the command cam (represented by character CAM, hereinafter) that is determined by cam selection command CAM, are read in steps 21 and 22, and at the same time, other input information is also read.

Figure 6:
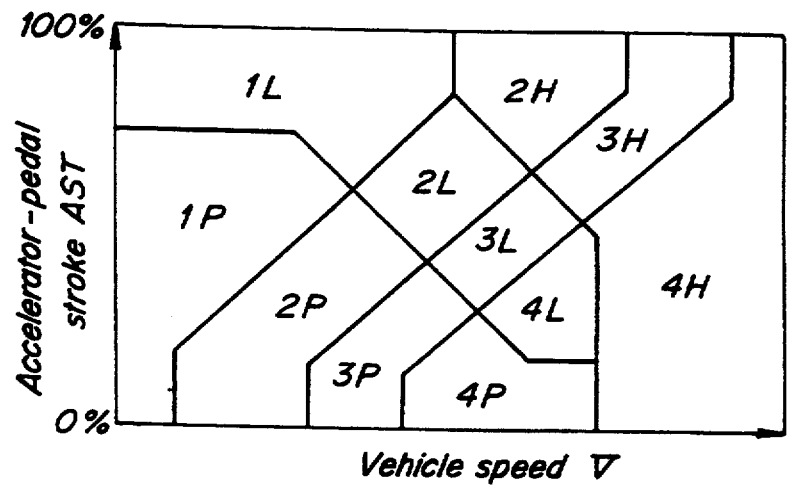
FIG. 6 is a control map in which the speed change stage and cam are combined in the aforementioned two examples.

In the next step 23, the two dimensional map shown in FIG. 6 is referred. On the map, vehicle speed V and accelerator pedal stroke AST are represented in such a manner that the combination of a preferable speed change stage (the first to the fourth stage) and a preferable cam (P, L and H cams) is shown (the numeral in each region represents a speed change stage, and a character represents a cam). On the map having predetermined table data, vehicle speed and accelerator pedal stroke data are read as shown in a region represented by not less than 4 grid points most close to a point of intersection of the present vehicle speed V and accelerator pedal stroke AST.

Figure 7:
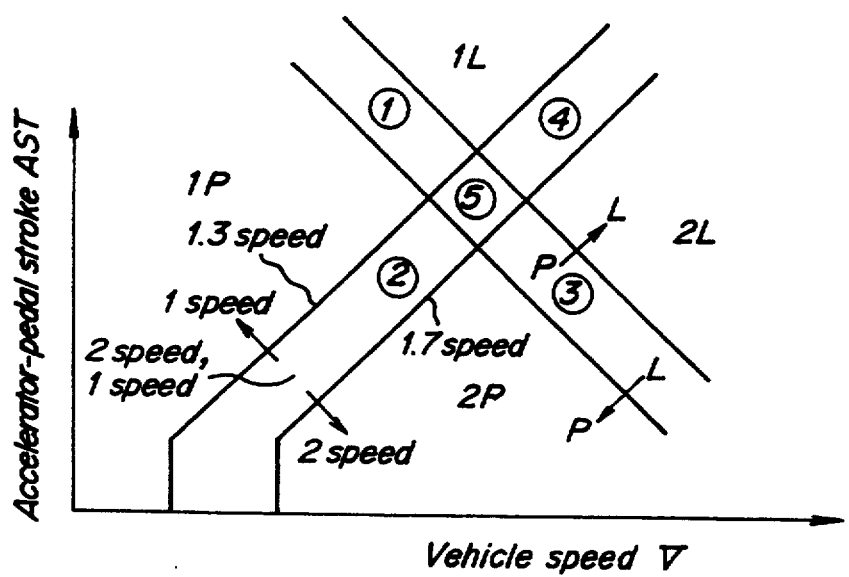
FIG. 7 is a partially enlarged view snowing the hysteresis of the map.

Incidentally, on each boundary of the region shown on the two dimensional map of FIG. 6, hysteresis (1) to (5) is set as shown in FIG. 7 that is a partially enlarged view. In FIG. 7, numeral (1) represents the hysteresis in the case where a cam is changed over between P and L cams while the speed change stage is maintained at the first speed. Numeral (2) represents the hysteresis in the case where the speed change stage is changed over between the first and second speed while the cam is maintained at P cam. Numeral (3) represents the hysteresis in the case where the cam is changed over between P and L cams while the speed change stage is maintained at the second speed. Numeral (4) represents the hysteresis in the case where the speed change stage is changed between the first and second speed while the cam is maintained L cam. Numeral (5) represents the hysteresis in the case where the cam is changed ever between P and L cams concurrently when the speed change stage is changed over between the first and second speed. Setting of hysteresis to change over the speed change stage will be explained as follows. For example, as shown in FIG. 7, the regions between the 1.3 speed and the 1.7 speed, which are obtained as a result of a calculation to interpolate between the grid points although such speed change stages do not exist substantially, are defined as hysteresis regions (2), (4) and (5), and the region not more than the 1.3 speed is defined as the first speed region, and the region not less than 1.7 speed is defined as the second speed region.

In the next step 24 shown in FIG. 3, the data of each grid point that has been read in step 23, is separated, and the speed change stage and the cam at each grid point are read. In step 25, according to the speed change stage and the cam that were read in step 24, an interpolating calculation is carried out, and preferable speed change stage S and preferable cam CAM at a point of intersection on FIG. 6 corresponding to the present vehicle speed V and accelerator pedal stroke AST, are calculated. In step 26, the present preferable speed change stage S and preferable cam CAM found by the interpolating calculation are compared with a speed change stage and cam that are being selected, so that whether the speed change stage and cam are to be changed over or not is judged while consideration is given to the aforementioned hysteresis.

Figure 8:
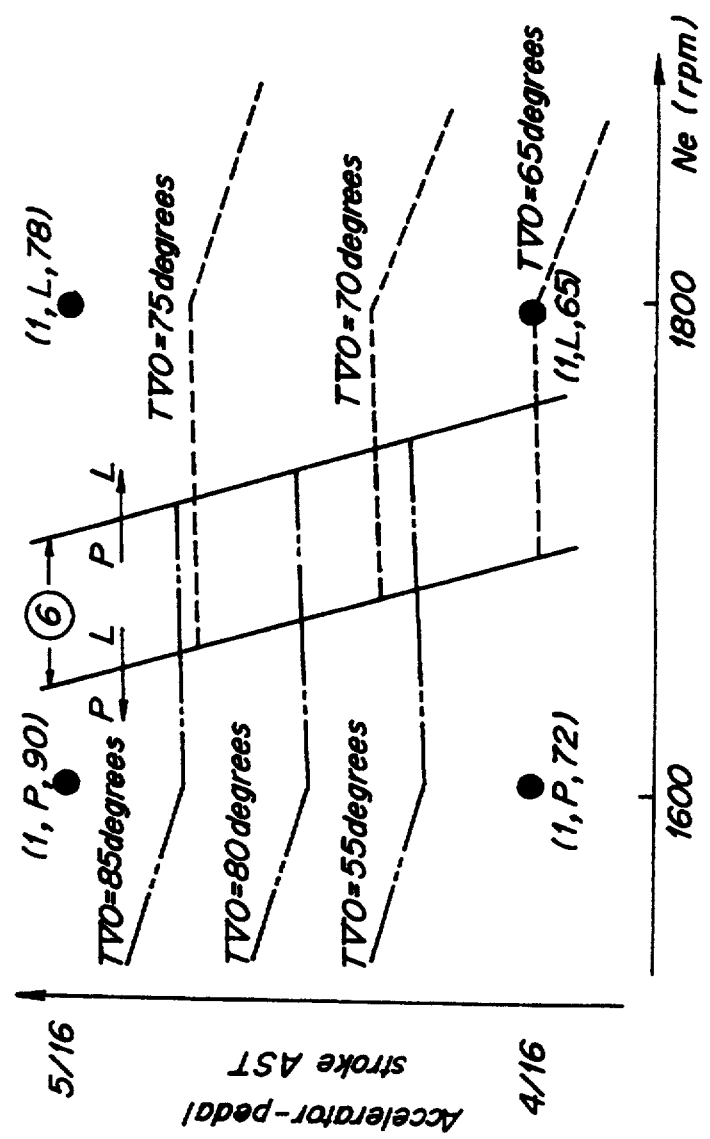
FIG. 8 is a throttle opening control map of the example shown in FIGS. 2 and 3.
Figure 9:
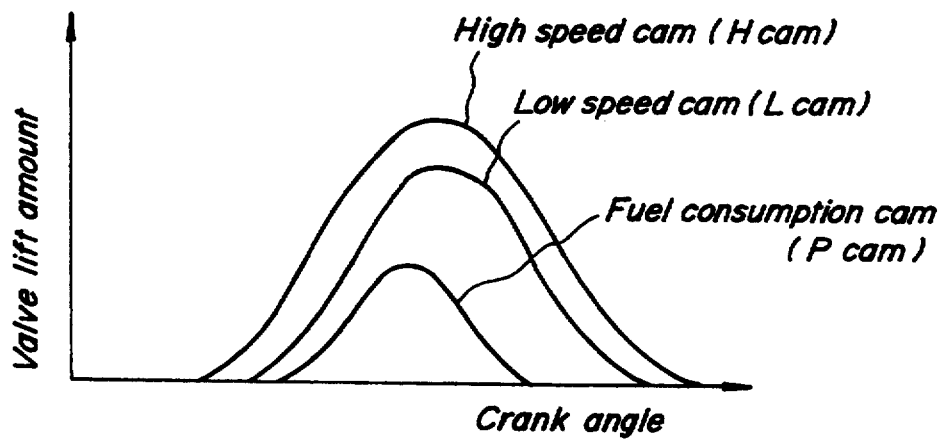
FIG. 9 is an operational characteristicsdiagram of three kinds of cams for suction and exhaust valves.
Figure 10:
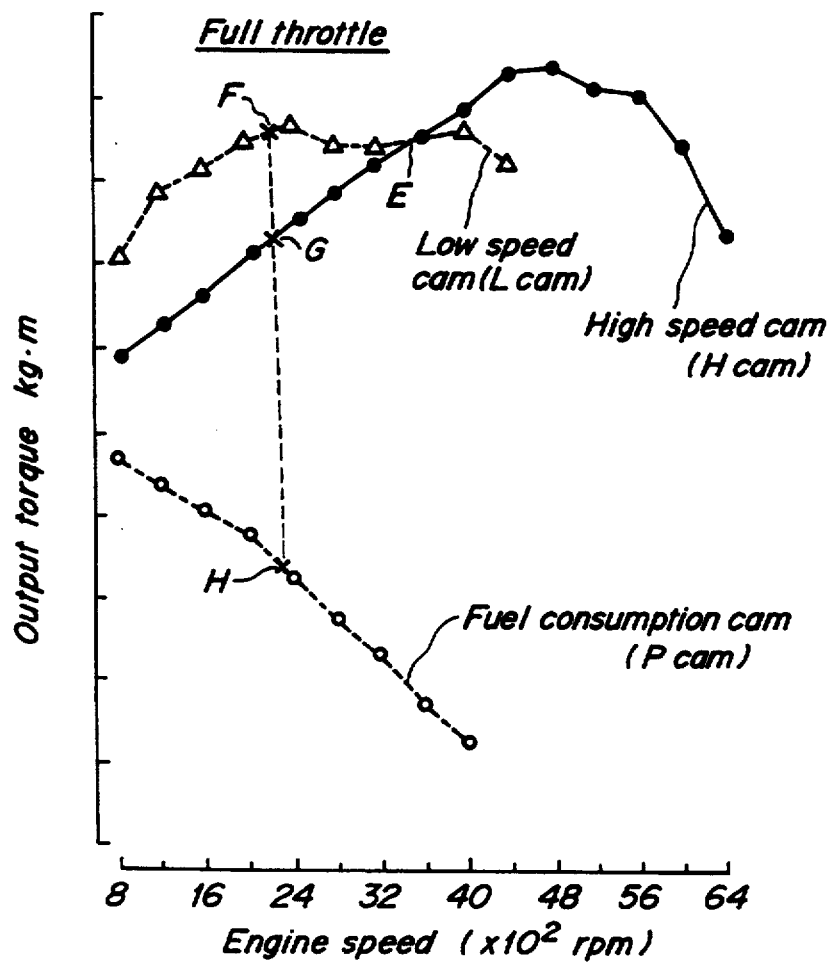
FIG. 10 is an engine output characteristic diagram in the case of full throttle when the cams are used properly.

In the next step 27, target throttle opening TVO at the aforementioned preferable speed change stage S and preferable cam CAM is calculated from engine revolution speed Ne and acceleration pedal stroke AST according to the table data shown in FIG. 8. FIG. 8 is a graph in which target throttle opening TVO is shown on a two dimensional map of engine speed Ne and accelerator pedal stroke AST, wherein preferable speed change stage S and preferable cam CAM are adopted for a parameter. In FIG. 8, a two-dotted chain line shows target throttle opening TVO at the first speed and P cam. A broken line shows target throttle opening TVO at the first speed and L cam. Further, numeral (6) shows the hysteresis in changeover regions of P and L cams. The numeral and character representing each point in FIG. 8, are defined as follows: the numeral on the left represents a speed change stage; the character disposed in the middle represents a cam; and the numeral on the right represents a throttle opening.

In the next step 28 shown in FIG. 3, the result of judgment in step 26 is checked, and a judgement is made as to whether or not it is necessary to change over the speed change stage and the cam. If it is not necessary, in the step 29 the controller 12 (shown in FIG. 2) commands preferable speed change stage S to the control valve 11 of the automatic transmission 2, and further commands preferable cam CAM to the cam changeover control valve 8 of the engine 1 so that the present preferable speed change stage and preferable cam can be maintained, and at the same time, the controller 12 commands target throttle opening TVO to the throttle actuator 7 so that the opening of the throttle valve 4 can become this target opening.

When it is judged in step 28 that the changeover of the speed change stage and cam is necessary, the control advances to step 30. In step 30, while conducting transition control for changeover, the controller 12 finally brings the speed change stage of the automatic transmission 2 to preferable speed change stage S, and also brings the cam of the engine 1 to preferable cam CAM, and further also brings the throttle valve 4 to target opening TVO. That is, when the speed change stage is changed over, transition control is conducted on the hydraulic pressure of the transmission and the throttle opening so that a shock caused in a gear change operation can be preferably reduced. A shock caused when the cam is changed over, is avoided in the following manner. When the cam is changed over in a region between L and H cams, the changeover is carried out at an equal torque point E in FIG. 8. When the cam is changed over in a region between P cam and other cams, the changeover is carried out while transition control is conducted on the throttle opening so that the engine output torque can be of a value F, G or H of a new cam exemplarily shown in FIG. 8. After the transition control has been completed, the throttle opening is set at target value TVO.

Figure 4:
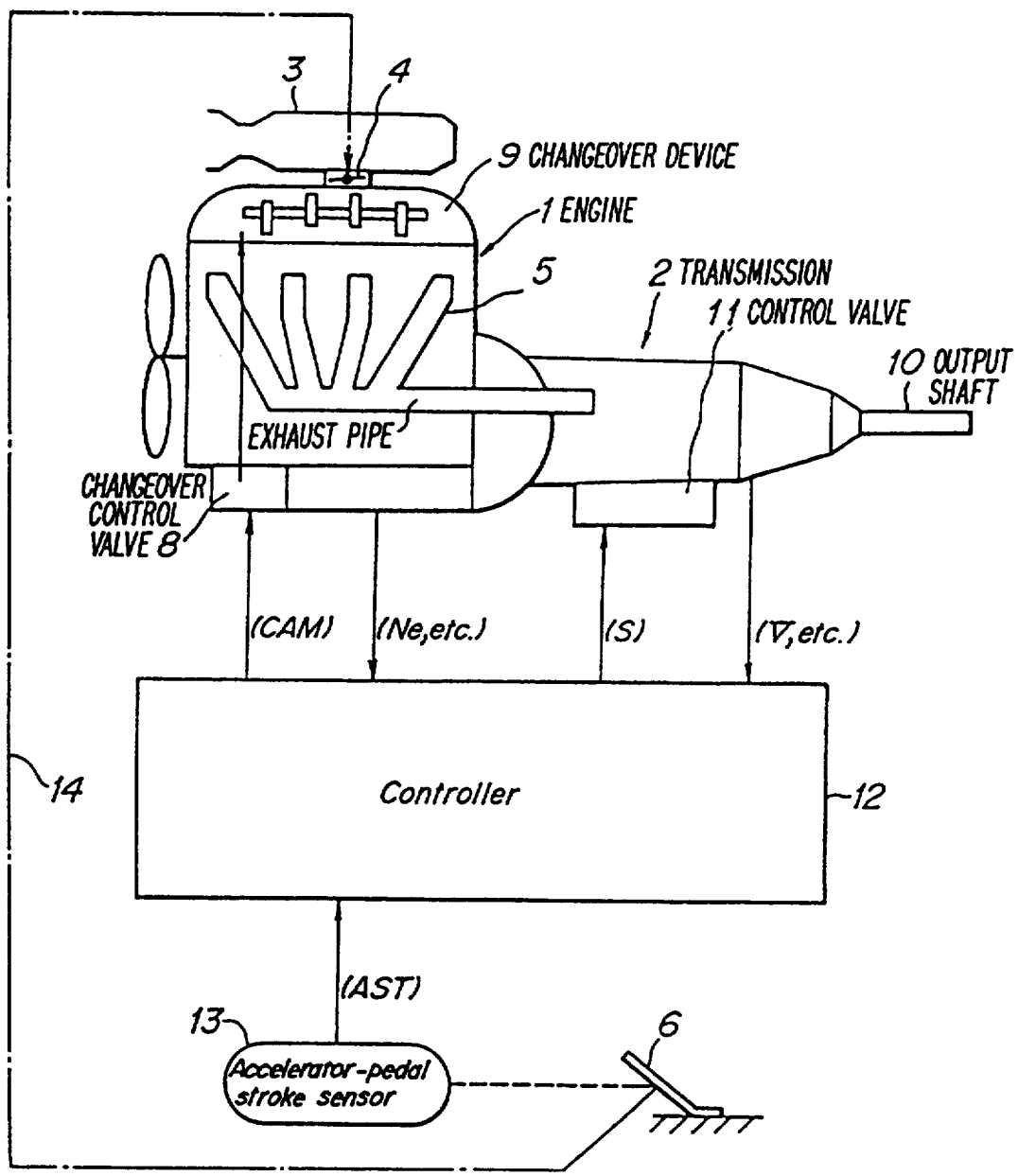
FIG. 4 is a block diagram of hardware showing another example of the present invention.
Figure 5:
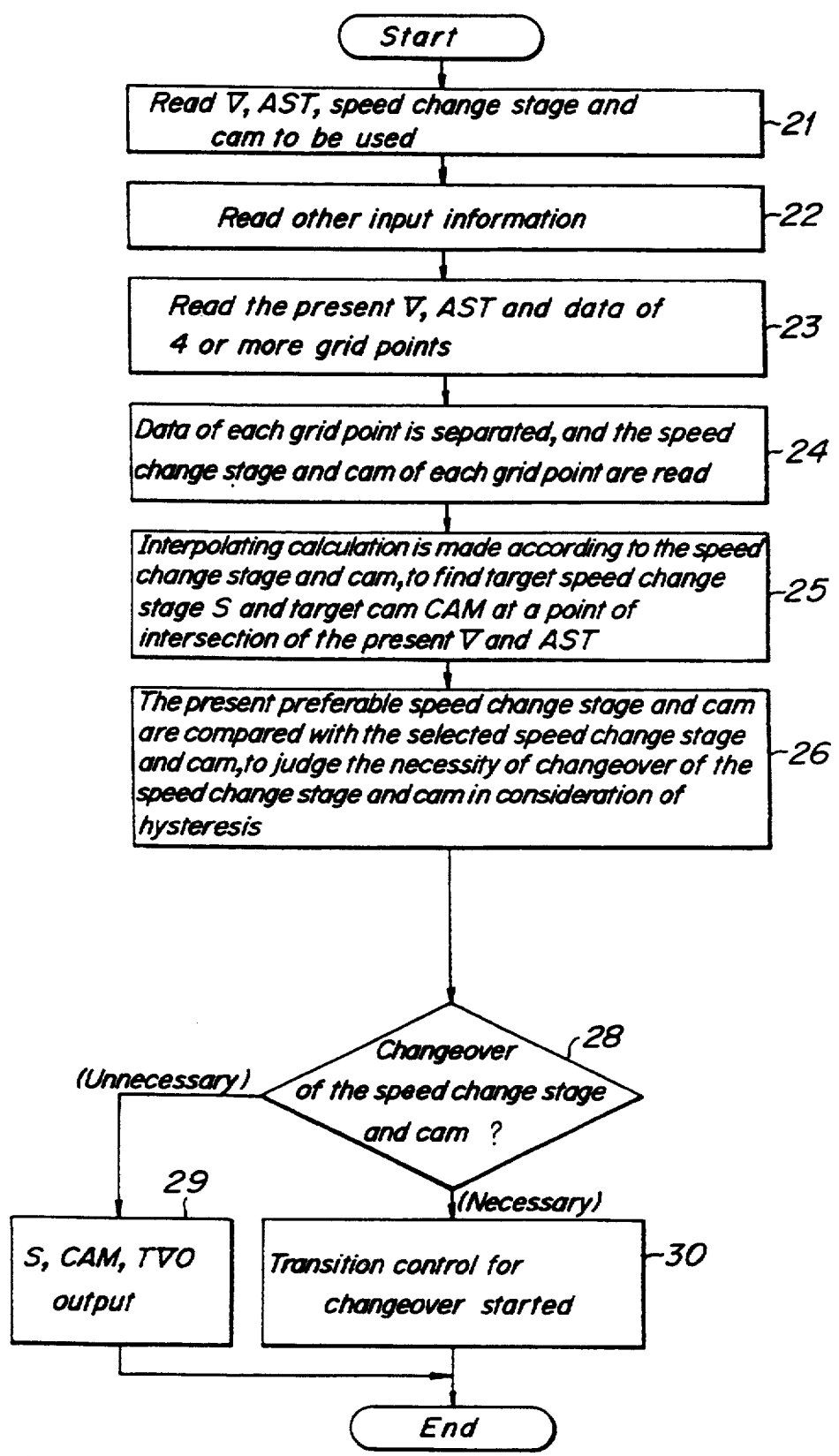
FIG. 5 is a flow chart of a control program that is carried out by a controller of the example.

In the aforementioned example, throttle opening TVO is electronically controlled. However, the same object can be accomplished in the case where the throttle opening is mechanically determined by a throttle linkage 14 when the accelerator 6 is stepped on as shown in FIG. 4. However, in the aforementioned example, of course, the control program shown in FIG. 5 to be carried out by the controller 12 must be composed as follows: the throttle opening calculation step 27 shown in the program of FIG. 3 is omitted; and throttle opening command TVO is removed from step 29 in FIG. 3.

While the present invention has so far been explained with reference to certain preferred embodiments, it is of course that they were presented by way of examples only to show the manner of how the invention may be carried out into practice, and various modifications and/or alterations may be made without departing from the scope of the invention as particularly defined in the appended claims.

I claim:

1. A control system for controlling an output power of a power train including an engine with a plurality of output characteristics which are changed based on a throttle opening of the engine, and an automatic transmission with a plurality of transmission gear ratios, said control system comprising:

a requested driving force detection means for detecting a driving force requested by an operator;

a speed detection means for detecting an output revolution speed of an output member of one of the transmission and the engine;

a control output determination means for selecting one combination of the output characteristics and the transmission gear ratios corresponding to the requested driving force and the output revolution speed detected by the speed detection means, from a plurality of predetermined combinations of the output characteristics and the transmission gear ratios in the form of a two dimensional map of the requested driving force and the output revolution speed; and a changeover execution means, connected to said control output determination means, for providing the control output determined by said combination, said control output determination means providing a hysteresis in the changeover of the combinations of the output characteristics and the transmission gear ratios, said hysteresis corresponding to hysteresis regions between adjacent output characteristic regions and between adjacent transmission gear ratio regions in said two dimensional map.

2. The control system according to claim 1, wherein the output characteristics of the engine are changed over based on cams for operating suction and exhaust valves of the engine.

3. The control system according to claim 1, wherein the requested driving force detection means detects a driving force requested by the operator from at least one of an accelerator pedal stroke for controlling the engine, an air intake amount of the engine, and a fuel injection amount of the engine.

4. The control system according to claim 1, wherein the control output determination means determines the throttle opening in accordance with the requested driving force, the output revolution speed of the output member of the engine, the output characteristics, and the transmission gear ratios.

* * * * *